(12) United States Patent
Kuzin et al.

(10) Patent No.: US 8,843,646 B2
(45) Date of Patent: Sep. 23, 2014

(54) MULTI-DESKTOP INTERACTION USING NESTED REMOTE DESKTOP SESSIONS

(75) Inventors: Sergey A. Kuzin, Redmond, WA (US); Christopher Benjamin Black, Kirkland, WA (US); Kashif Mehmood, Bellevue, WA (US); Amjad Hussain, Kirkland, WA (US); Ido Miles Ben-Shachar, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 474 days.

(21) Appl. No.: 13/327,704

(22) Filed: Dec. 15, 2011

(65) Prior Publication Data

US 2013/0067100 A1   Mar. 14, 2013

Related U.S. Application Data

(60) Provisional application No. 61/533,751, filed on Sep. 12, 2011.

(51) Int. Cl.
*G06F 15/16* (2006.01)
*H04L 29/08* (2006.01)
*H04L 29/06* (2006.01)

(52) U.S. Cl.
CPC .......... *H04L 67/08* (2013.01); *H04L 29/06394* (2013.01); *H04L 65/4007* (2013.01)
USPC ............................................. 709/228; 726/7

(58) Field of Classification Search
USPC ............................................. 709/228; 726/7
See application file for complete search history.

(56) References Cited

U.S. PATENT DOCUMENTS

| 6,085,247 | A | 7/2000 | Parsons, Jr. et al. |
|---|---|---|---|
| 7,594,018 | B2 | 9/2009 | Pedersen |
| 7,600,027 | B2 | 10/2009 | Yan |
| 2007/0174410 | A1 | 7/2007 | Croft et al. |
| 2008/0005236 | A1 | 1/2008 | Schmieder |
| 2008/0270910 | A1 | 10/2008 | Lukasik et al. |
| 2010/0146611 | A1* | 6/2010 | Kuzin et al. ........................ 726/8 |
| 2010/0223558 | A1 | 9/2010 | Feng |
| 2011/0162062 | A1* | 6/2011 | Kumar et al. ................... 726/15 |

OTHER PUBLICATIONS

"Nesting Remote Desktop Connections", Retrieved on: Aug. 29, 2011, Available at: http://www.solo-technology.com/blog/2007/06/07/nesting-remote-desktop-connections/.

* cited by examiner

*Primary Examiner* — Shirley Zhang
(74) *Attorney, Agent, or Firm* — Jim Sfekas; Alin Corie; Micky Minhas

(57) ABSTRACT

As described herein, a computer system receives a first indication that an interactive login session is to be established. The first indication includes user credentials for establishing the interactive login session. The computer system then establishes the interactive login session using the received user credentials. The interactive login session includes a data transfer endpoint for receiving data from other sessions. The computer system receives a second indication that a child session is to be established in parallel to the established interactive login session. The child session is configured to direct input and output data through a loopback connection to the data transfer endpoint of the interactive login session. The computer system also establishes the child session using the received user credentials. The child session then transfers at least a portion of data to the data transfer endpoint of the interactive login session using the loopback connection.

20 Claims, 4 Drawing Sheets

MULTI-DESKTOP INTERACTION USING NESTED REMOTE DESKTOP SESSIONS

CROSS-REFERENCE TO RELATED APPLICATIONS

This application claims the benefit of and priority to U.S. Provisional Application No. 61/533,751, entitled "USING NESTED REMOTE DESKTOP SESSIONS TO SIMULTANEOUSLY INTERACT WITH MULTIPLE DESKTOPS", filed on Sep. 12, 2011, which is incorporated by reference in its entirety herein.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed to interact with other software applications or other computer systems. For example, remote desktop applications may allow a local computer system to interact with an application run on a remote server or other computer system. The user on the local system typically begins a local computer session in which he or she runs local applications. To access an application run on a remote computer system, the user typically initiates a remote desktop application. This application allows the user to view and interact with the remote application.

BRIEF SUMMARY

Embodiments described herein are directed to instantiating a child session in parallel to an interactive login session and to instantiating multiple child sessions in parallel to an interactive login session. In one embodiment, a computer system receives a first indication that an interactive login session is to be established. The first indication includes user credentials for establishing the interactive login session. The computer system then establishes the interactive login session using the received user credentials. The interactive login session includes a data transfer endpoint for receiving data from other sessions. The computer system receives a second indication that a child session is to be established in parallel to the established interactive login session. The child session is configured to direct input and output data through a loopback connection to the data transfer endpoint of the interactive login session. The computer system also establishes the child session using the received user credentials. The child session then transfers at least a portion of data to the data transfer endpoint of the interactive login session using the loopback connection.

In another embodiment, a computer system instantiates multiple different child sessions in parallel to an interactive login session. As above, the computer system receives a first indication that an interactive login session is to be established, where the indication includes user credentials for establishing the interactive login session. The computer system then establishes the interactive login session using the received user credentials. The interactive login session includes a data transfer endpoint for receiving data from one or more child sessions. The computer system then receives a second indication that multiple different child sessions are to be established in parallel to the established interactive login session. The child sessions are configured to direct input and output data through a loopback connection to the data transfer endpoint of the interactive login session. Each child session provides a distinct and isolated user environment that is different from the environment provided by the interactive login session. The computer system establishes the multiple different child sessions simultaneously on the same computer system using the received user credentials to automatically log in to each child session, and then receive, at the data transfer endpoint of the interactive login session, child session data from the multiple different child sessions using the loopback connection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Figure 1:
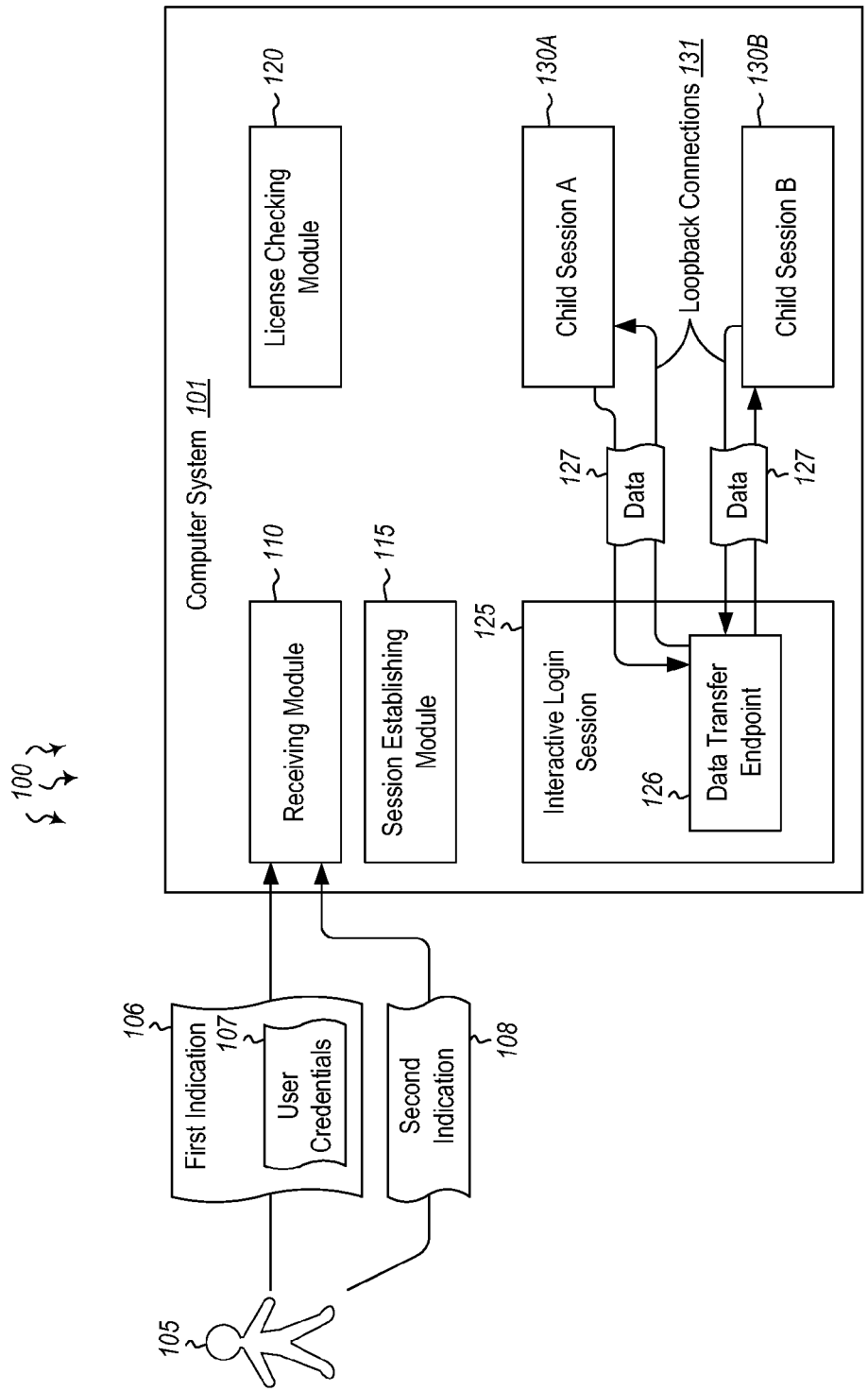
FIG. 1 illustrates a computer architecture in which embodiments of the present invention may operate including instantiating a child session in parallel to an interactive login session.

Embodiments described herein are directed to instantiating a child session in parallel to an interactive login session and to instantiating multiple child sessions in parallel to an interactive login session. In one embodiment, a computer system receives a first indication that an interactive login session is to be established. The first indication includes user credentials for establishing the interactive login session. The computer system then establishes the interactive login session using the received user credentials. The interactive login session includes a data transfer endpoint for receiving data from other sessions. The computer system receives a second indication that a child session is to be established in parallel to the established interactive login session. The child session is configured to direct input and output data through a loopback connection to the data transfer endpoint of the interactive login session. The computer system also establishes the child session using the received user credentials. The child session then transfers at least a portion of data to the data transfer endpoint of the interactive login session using the loopback connection.

In another embodiment, a computer system instantiates multiple different child sessions in parallel to an interactive login session. As above, the computer system receives a first indication that an interactive login session is to be established, where the indication includes user credentials for establishing the interactive login session. The computer system then establishes the interactive login session using the received user credentials. The interactive login session includes a data transfer endpoint for receiving data from one or more child sessions. The computer system then receives a second indication that multiple different child sessions are to be established in parallel to the established interactive login session. The child sessions are configured to direct input and output data through a loopback connection to the data transfer endpoint of the interactive login session. Each child session provides a distinct and isolated user environment that is different from the environment provided by the interactive login session. The computer system establishes the multiple different child sessions simultaneously on the same computer system using the received user credentials to automatically log in to each child session, and then receive, at the data transfer endpoint of the interactive login session, child session data from the multiple different child sessions using the loopback connection.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

FIG. 1 illustrates a computer architecture 100 in which the principles of the present invention may be employed. Computer architecture 100 includes computer system 101. The computer system may be any type of local or distributed computer system including a cloud computing system. The computer system may include various different modules and other software and hardware components for performing different tasks. For instance, the receiving module 110 may be configured to receive communications from users such as user 105. User 105 may send various different indications or requests to the computer system. The computer system may use its different modules to respond to the user's requests.

In one embodiment, the first indication 106 sent by user 105 indicates that an interactive login session is to be established. As used herein, an interactive login session refers to a session established between the user and the client computer system using the user's login credentials 107 that allows the user to access various different applications and other features that are available to that user based on his or her identity. The interactive login session may allow the user to access a suite of software applications specifically selected for that user. In response to the received indication 106, the session establishing module 115 may establish the interactive login session 125 between the user 105 and the client computer system 101. The interactive login session may establish a data transfer endpoint 126. The data transfer endpoint may be used to receive data from and transfer data to one or more established child sessions 130A/130B. These components and their corresponding functionality will be explained further below with regard to methods 200 and 300 of FIGS. 2 and 3, respectively.

Figure 2:
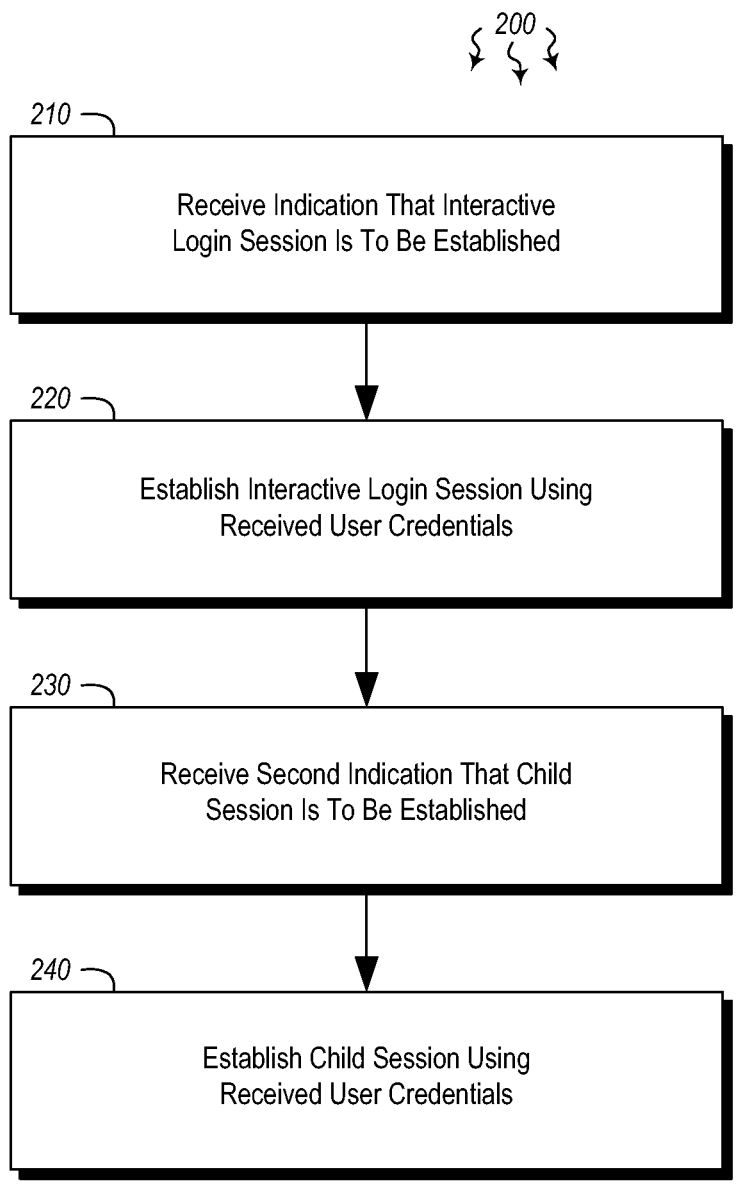
FIG. 2 illustrates a flowchart of an example method for instantiating a child session in parallel to an interactive login session.
Figure 3:
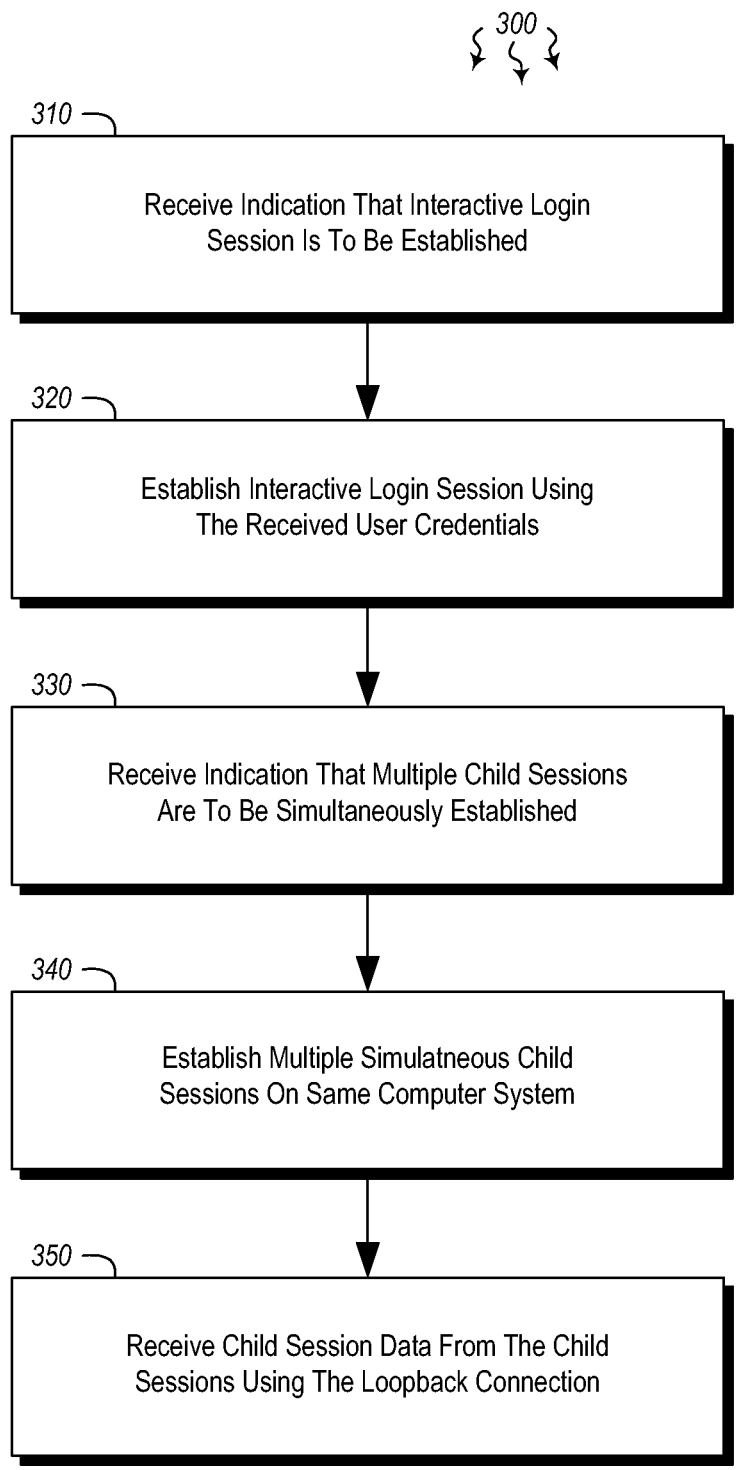
FIG. 3 illustrates a flowchart of an example method for instantiating multiple child sessions in parallel to an interactive login session.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for instantiating a child session in parallel to an interactive login session. The method 200 will now be described with frequent reference to the components and data of environments 100 and 400 of FIGS. 1 and 4, respectively.

Method 200 includes an act of receiving a first indication that an interactive login session is to be established, wherein the first indication includes user credentials for establishing the interactive login session (act 210). For example, receiving module 110 of computer system 101 may receive first indication 106 from user 105. The first indication may indicate that an interactive login session is to be established for the user. The interactive login session 125 may be local session or a remote session. As used herein, a local session refers to a session hosted on the end-user's computer system. A remote session refers to a session hosted on a network-accessible computer system to which the end-user's computer system is connected. As will be seen below, the interactive login session that is established and used to run one or more child sessions may be a local or a remote session.

Method 200 includes an act of establishing the interactive login session using the received user credentials, the interactive login session including a data transfer endpoint for receiving data from other sessions (act 220). Thus, upon receiving the indication that such a session is to be established, the session establishing module 115 of computer system 101 may establish interactive login session 125 using the received user login credentials 107. When the session is established, or at some point thereafter, a data transfer endpoint may be established within the interactive login session. The data transfer endpoint 126 receives data from and transfers data to various different child sessions (e.g. child session A (130A) or child session B (130B). The data 127 may be sent via a loopback connection 131 to and from the child sessions. The loopback connection ensures that the data is transferred directly from the child session to the user's interactive login session, or from the login session to the child session. The child session(s) may be established upon receiving an indication from the user 105 that such a session is to be established. Although only two child sessions are shown in FIG. 1, substantially any number of child sessions may be established.

Method 200 also includes an act of receiving a second indication that a child session is to be established in parallel to the established interactive login session, the child session being configured to direct input and output data through a loopback connection to the data transfer endpoint of the interactive login session (act 230). For example, receiving module 110 of computer system 101 may receive second indication 108 from user 105. The second indication may indicate that one or more child sessions 130A/130B are to be established in parallel to the interactive login session. As used herein, child sessions refer to interactive desktop sessions that may be similar to, the same as, or different than the parent session 125. The child sessions may be viewed as nested desktop sessions that show entirely different views than the view provided by the parent interactive login session 125.

Figure 4:
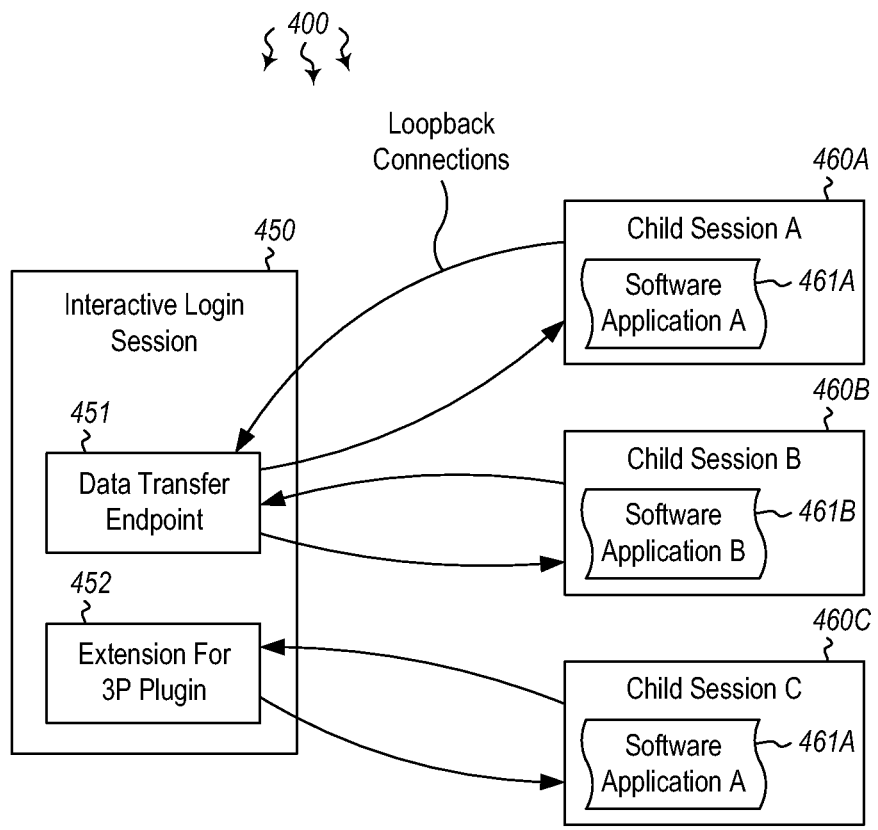
FIG. 4 illustrates an embodiment in which multiple child sessions are established in parallel to an interactive login session.

For instance, as shown in FIG. 4, each child session may run different software applications. Child session A (460A) may run software application A (461A). Child session B (460B) runs software application B (461B), as well as one or more other, different software applications. Child session C (460C) may run the same software applications as child session A (application A), or may run different applications. Furthermore, each child session may be instantiated with different software applications depending on which user logs in. Thus, in some cases, the applications instantiated on each child session may depend on the user's identity (verified by login credentials 107). Accordingly, one user may receive a certain set of applications, while another user receives another set. These child sessions may be used in different scenario including debugging and testing. Child sessions may be opened and closed as desired by the user.

The data that is sent to and received from the child sessions is through a loopback connection 131 to the data transfer endpoint 126/451 of the interactive login session 125/450. The loopback connection may be used as a secure, direct data transfer between sessions. In some cases, the loopback connection may direct the input and output data 127 to the data transfer endpoint of the interactive login session instead of being transferred to local computer system hardware. This may reduce data transfer times and increase speed and efficiency. Using a loopback connection, each child session may interact directly with the data transfer endpoint of the parent (local or remote) interactive login session in a quick, efficient and secure manner.

Each child session may provide a distinct and isolated user environment that is different from the environment provided by the interactive login session. Multiple different child sessions may be simultaneously established and run on the same computer system. Furthermore, multiple different applications may be run on each different child session. The lifetime of each established child session is directly linked to the lifetime of the parent session. Thus, if the parent session is closed, suspended or otherwise changed, the child sessions will also be changed in the same manner.

Method 200 includes an act of establishing the child session using the received user credentials, wherein the child session transfers at least a portion of data to the data transfer endpoint of the interactive login session using the loopback connection (act 240). Thus, after receiving the second indication 108, session establishing module 115 of computer system 101 instantiates child session A (130A) and/or child session B (130B) using the received user credentials 107. The user may be automatically logged in to each of the established child sessions using the user's provided user credentials. The session transfers its data (including potentially graphics data) to the data transfer endpoint of the parent interactive login session 125. The local, secure loopback connection provides efficient and reliable data transfer between the parent and child sessions.

In some embodiments, the child sessions may be provided in a container that is configured for hosting by other software applications. As such, the hosting software applications may host the child session to provide different types of views (e.g. different desktop views). The data transfer endpoint 126 may also be provided to third parties by means of an extension to the interactive login session. Such an extension may allow third party plugins for implementation in the interactive login session. Using these plugins, a third party could access and use the data transfer endpoint as a part of their own, proprietary software applications.

FIG. 3 illustrates a flowchart of a method 300 for instantiating multiple child sessions in parallel to an interactive login session. The method 300 will now be described with frequent reference to the components and data of environment 100 of FIG. 1.

Method 300 includes an act of receiving a first indication that an interactive login session is to be established, wherein the first indication includes user credentials for establishing the interactive login session (act 310). For instance, receiving module 110 of computer system 101 may receive first indication 106 from user 105 indicating that an interactive login session is to be established for the user. The first indication includes the user's login credentials 107, which are used to establish the interactive login session 125.

In response to receiving the first indication, session establishing module 115 establishes interactive login session 125 using the received user credentials 107 (act 320). The interactive login session includes a data transfer endpoint 126 for receiving data from child sessions A and/or B (or from other established child sessions).

Method 300 also includes an act of receiving a second indication that a plurality of child sessions are to be established in parallel to the established interactive login session, wherein the child sessions are configured to direct input and output data through a loopback connection to the data transfer endpoint of the interactive login session, each child session providing a distinct and isolated user environment that is different from the environment provided by the interactive login session (act 330). Thus, upon receiving a subsequent indication that at least one child session is to be established, those child sessions are established by module 115.

In some cases, licensing checks may be performed to determine whether each child session has a corresponding license. Thus, license checking module 120 may be used to perform these license checks. Upon passing the license check, the child session is established. The child session transfers data to the data transfer endpoint within the parent interactive login session 125. In this manner, the data stays local to the computer system 101, and is transferred on a secure data path. Accordingly, child session application data, graphics data or any other session-related data may be transferred using the loopback connection.

In response to receiving the second indication 108 from user 105, the session establishing module establishes the different child sessions 130A/130B simultaneously on the same computer system using the received user credentials to automatically log in to each child session (act 340). Thus, substantially any number of child sessions may be established and run simultaneously on computer system 101. Each child session may include different software applications or different user settings. Each child session is accessible via the interactive login session 125, or, at least in some cases, via a remote desktop connection.

The data transfer endpoint of the parent interactive login session 125 receives child session data from the different child sessions using the loopback connection 131 (act 350). In this manner, the child sessions can provide different views for the user 105 to use for debugging, testing or for other purposes. The data of the child sessions is transferred to and from the interactive login session in a secure and efficient manner. Accordingly, methods, systems and computer program products are provided which instantiate one or more child sessions in parallel to an interactive login session.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, a computer-implemented method for instantiating a child session in parallel to an interactive login session, the method comprising:

an act of receiving a first indication that an interactive login session is to be established, wherein the first indication includes user credentials for establishing the interactive login session;

an act of establishing the interactive login session using the received user credentials, the interactive login session including a data transfer endpoint for receiving data from other sessions;

an act of receiving a second indication that a child session is to be established in parallel to the established interactive login session, the child session being configured to direct input and output data through a loopback connection to the data transfer endpoint of the interactive login session; and an act of establishing the child session using the received user credentials, wherein the child session transfers at least a portion of data to the data transfer endpoint of the interactive login session using the loopback connection.

2. The method of claim 1, wherein the input and output data of the child session are directed to the data transfer endpoint of the interactive login session instead of being transferred to local computer system hardware.

3. The method of claim 1, wherein the child session's lifetime is directly linked to the lifetime of the interactive login session.

4. The method of claim 1, wherein the interactive login session is a remote session.

5. The method of claim 1, wherein the interactive login session is a local session.

6. The method of claim 1, wherein a plurality of child sessions are established and run simultaneously on the same computer system.

7. The method of claim 6, wherein each child session provides a distinct and isolated user environment that is different from the environment provided by the interactive login session.

8. The method of claim 7, wherein each child session is configured to run a plurality of different applications.

9. The method of claim 1, further comprising performing one or more licensing checks to determine that the child sessions each have a corresponding license.

10. The method of claim 7, wherein the user is automatically logged in to the child sessions using the provided user credentials.

11. The method of claim 1, wherein the data transferred via the loopback connection includes graphics data for the child session.

12. The method of claim 1, further comprising providing an extension that allows third party plugins to access the data transfer endpoint of the interactive login session.

13. The method of claim 1, wherein the child session is provided in a container that is configured for hosting by one or more other software applications.

14. A computer program product for implementing a method for instantiating a plurality of child sessions in parallel to an interactive login session, the computer program product comprising one or more computer-readable storage device having stored thereon computer-executable instructions that, when executed by one or more processors of the computing system, cause the computing system to perform the method, the method comprising:
 an act of receiving a first indication that an interactive login session is to be established, wherein the first indication includes user credentials for establishing the interactive login session;
 an act of establishing the interactive login session using the received user credentials, the interactive login session including a data transfer endpoint for receiving data from one or more child sessions;
 an act of receiving a second indication that a plurality of child sessions are to be established in parallel to the established interactive login session, wherein the child sessions are configured to direct input and output data through a loopback connection to the data transfer endpoint of the interactive login session, each child session providing a distinct and isolated user environment that is different from the environment provided by the interactive login session;
 an act of establishing the plurality of child sessions simultaneously on the same computer system using the received user credentials to automatically log in to each child session; and
 an act of receiving, at the data transfer endpoint of the interactive login session, child session data from the plurality of child sessions using the loopback connection.

15. The computer program product of claim 14, further comprising performing one or more licensing checks to determine that the child sessions each have a corresponding license.

16. The computer program product of claim 14, wherein at least one of the child sessions is configured to run a debugging operation.

17. The computer program product of claim 14, wherein the data transferred via the loopback connection remains local to the computing system.

18. The computer program product of claim 14, wherein at least one of the plurality of child sessions is accessible via a remote desktop connection.

19. A computer system comprising the following:
 one or more processors;
 system memory;
 one or more computer-readable storage media having stored thereon computer-executable instructions that, when executed by the one or more processors, causes the computing system to perform a method for instantiating a plurality of child sessions in parallel to an interactive login session, the method comprising the following:
  an act of receiving a first indication that an interactive login session is to be established, wherein the first indication includes user credentials for establishing the interactive login session;
  an act of establishing the interactive login session using the received user credentials, the interactive login session including a data transfer endpoint for receiving data from one or more child sessions;
  an act of receiving a second indication that a plurality of child sessions are to be established in parallel to the established interactive login session, wherein the child sessions are configured to direct input and output data through a loopback connection to the data transfer endpoint of the interactive login session, each child session providing a distinct and isolated user environment that is different from the environment provided by the interactive login session;
  an act of performing one or more licensing checks to determine that the child sessions each have a corresponding license;
  an act of establishing the plurality of child sessions simultaneously on the same computer system using the received user credentials to automatically log in to each child session; and
  an act of receiving, at the data transfer endpoint of the interactive login session, child session data from the plurality of child sessions using the loopback connection.

20. The computer system of claim 19, wherein each child session is configured to run a plurality of different software applications.

* * * * *